(12) United States Patent
Farrow et al.

(10) Patent No.: US 12,189,185 B2
(45) Date of Patent: Jan. 7, 2025

(54) ALL-FIBER DIVERGENCE LIMITER

(71) Applicant: nLIGHT, Inc., Camas, WA (US)

(72) Inventors: Roger L. Farrow, Vancouver, WA (US); Dahv A. V. Kliner, Portland, OR (US); Tyson L. Lowder, Vancouver, WA (US)

(73) Assignee: nLIGHT, Inc., Camas, WA (US)

( * ) Notice: Subject to any disclaimer, the term of this patent is extended or adjusted under 35 U.S.C. 154(b) by 195 days.

(21) Appl. No.: 17/759,286

(22) PCT Filed: Jan. 21, 2021

(86) PCT No.: PCT/US2021/014456
§ 371 (c)(1),
(2) Date: Jul. 21, 2022

(87) PCT Pub. No.: WO2021/150782
PCT Pub. Date: Jul. 29, 2021

(65) Prior Publication Data
US 2023/0106619 A1    Apr. 6, 2023

Related U.S. Application Data

(60) Provisional application No. 62/964,461, filed on Jan. 22, 2020.

(51) Int. Cl.
*G02B 6/26* (2006.01)
*G02B 6/14* (2006.01)
*G02B 6/255* (2006.01)

(52) U.S. Cl.
CPC .............. *G02B 6/262* (2013.01); *G02B 6/14* (2013.01); *G02B 6/266* (2013.01); *G02B 6/2558* (2013.01)

(58) Field of Classification Search
CPC .......... G02B 6/14; G02B 6/262; G02B 6/266
See application file for complete search history.

(56) References Cited

U.S. PATENT DOCUMENTS

| 9,634,461 | B1 * | 4/2017 | Johnson ............... G02B 6/2746 |
| 2005/0265653 | A1 | 12/2005 | Cai et al. |
| 2018/0239154 | A1 | 8/2018 | Martinsen et al. |
| 2018/0331488 | A1 | 11/2018 | Farrow et al. |
| 2019/0265419 | A1 * | 8/2019 | Tayebati ................. H01S 3/23 |
| 2020/0033188 | A1 * | 1/2020 | Hidaka ................. G01M 11/02 |

FOREIGN PATENT DOCUMENTS

| CN | 103926650 A | 7/2014 |
| CN | 105204117 A | 12/2015 |
| JP | 2016161867 A | 9/2016 |
| WO | WO2018173844 A1 | 9/2018 |

OTHER PUBLICATIONS

Feng Li, English Translation of CN 103926650 A, 4 pages (Year: 2014).*

* cited by examiner

*Primary Examiner* — Daniel Petkovsek
(74) *Attorney, Agent, or Firm* — WILEY REIN LLP

(57) ABSTRACT

Disclosed is an optical fiber-based divergence-limiting device for limiting divergence from a first maximum divergence of input light to a second maximum divergence of output light, in which the second maximum divergence is less than the first maximum divergence.

13 Claims, 8 Drawing Sheets

ALL-FIBER DIVERGENCE LIMITER

RELATED APPLICATION

This application is a National Stage of International Application No. PCT/US2021/014456, filed Jan. 21, 2021, which claims priority benefit of U.S. Provisional Patent Application No. 62/964,461, filed Jan. 22, 2020, both of which are hereby incorporated by reference in their entireties.

TECHNICAL FIELD

The disclosure pertains to fiber-coupled lasers.

BACKGROUND INFORMATION

Applications of high-power fiber lasers often include limitations on the maximum divergence of the laser beam. For example, optics downstream of the laser (e.g., in a processing head) may impose a limit on total optical power at divergence angles greater than $\theta_{max}$, which is the divergence half-angle above which optical components have power limitations. The angle $\theta$ is defined as the half-angle of a cone enclosing a fraction of the diverging beam.

SUMMARY OF THE DISCLOSURE

Disclosed is an optical fiber-based divergence-limiting device for limiting divergence from a first maximum divergence of input light to a second maximum divergence of output light, in which the second maximum divergence is less than the first maximum divergence. In some embodiments, the optical fiber-based divergence-limiting device includes an input configured to receive the input light; an output configured to deliver the output light; a core through which a first portion of the input light is configured to be guided from the input to the output, the core having a numerical aperture (NA) configured to limit the first portion of the input light to that having the second maximum divergence or less; and a cladding covering at least a portion of the core and through which a second portion of the input light is configured to diverge from the first portion such that the second portion of the input light is directed away from the core and thereby form the output light.

The device may also include an enclosure housing a least a portion of the cladding from which stripped lighted is configured to be emitted and absorbed by an internal surface of the enclosure.

The device may also include a cladding-light stripper (CLS) fiber, which includes the core and cladding. The CLS fiber may include a CLS region along a lengthwise portion of the CLS fiber. The CLS region may include a coated section along the cladding, in which the coated section has a refractive index that is greater than or equal to that of the cladding. The CLS region may include a roughened-surface section along the cladding. The CLS region may include a structured-surface section along the cladding. The CLS region may be chemically treated or laser processed. The device may also include a fiber coil or a fiber taper in the CLS region.

The device may also include a fiber taper formed in the core and cladding.

The device may also include the cladding in a non-circular cross-sectional shape.

The device may also include an intermediate optical fiber having the core and the cladding.

The device may also include the intermediate optical fiber spliced between an input optical fiber and an output optical fiber. The device may also include an input pigtail including the input optical fiber. The device may also include an output pigtail including the output optical fiber.

Additional aspects and advantages will be apparent from the following detailed description of embodiments, which proceeds with reference to the accompanying drawings.

BRIEF DESCRIPTION OF THE DRAWINGS

The accompanying drawings, wherein like reference numerals represent like elements, are incorporated in and constitute a part of this specification and, together with the description, explain the advantages and principles of the presently disclosed technology. In the drawings.

DETAILED DESCRIPTION

Figure 1:
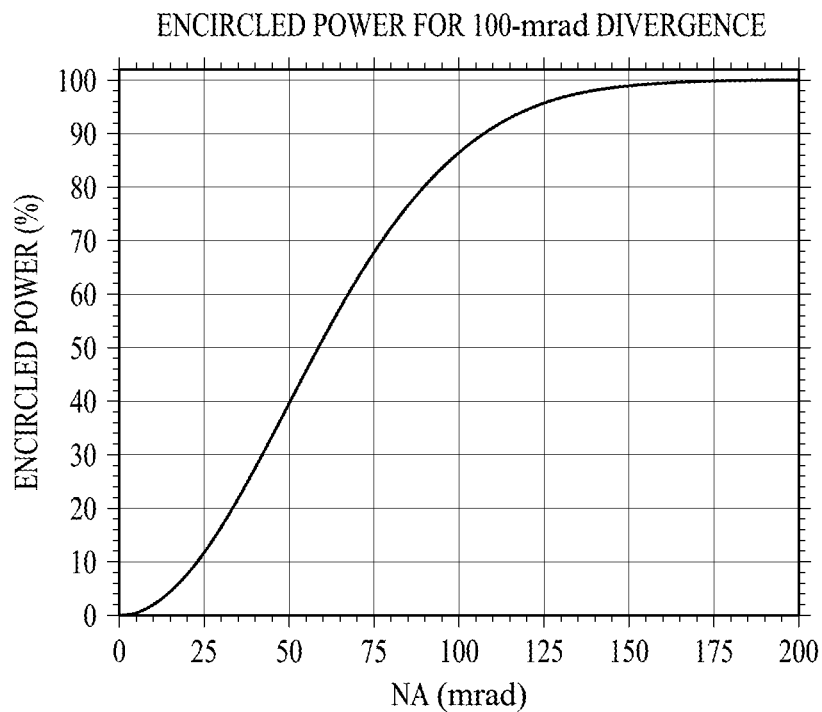
FIG. 1 is a graph showing a divergence profile of a beam having a divergence width of 100 mrad, $1/e^2$ half-width, plotted as sin $\theta$=numerical aperture (NA)

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items. The systems, apparatus, and methods described herein should not be construed as limiting in any way. Instead, the present disclosure is directed toward all novel and non-obvious features and aspects of the various disclosed embodiments, alone and in various combinations and sub-combinations with one another.

The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation. Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus.

Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by skilled persons. In some examples, values, procedures, or apparatus are referred to as "lowest," "best," "minimum," or the like. It will be appreciated that such descriptions are intended to indicate that a selection among many used functional alternatives can be made, and such selections need not be better, smaller, or otherwise preferable to other selections. Examples are described with reference to directions indicated as "above," "below," "upper," "lower," and the like. These terms are used for convenient description, but do not imply any particular spatial orientation. For the sake of simplicity and readability, in the drawings single elements are labeled. Where there is a plurality of identical elements, representative example elements will be labeled rather than labeling each of the plurality of elements.

FIG. 1 shows the divergence profile of a beam with a divergence width of 100 mrad ($1/e^2$ half-width, plotted as sin $\theta$=NA (numerical aperture)). For an optical system with $\theta_{max}$=125 mrad, the wings of the beam that are shaded and identified by dashed lines in FIG. 2 (angles>$\theta_{max}$) would be clipped (i.e., lost by the optical system, and typically converted to heat). The maximum clipped power is determined by the design of the optical system, specifically by the ability to dump the power without overheating or burning any components.

Figure 2:
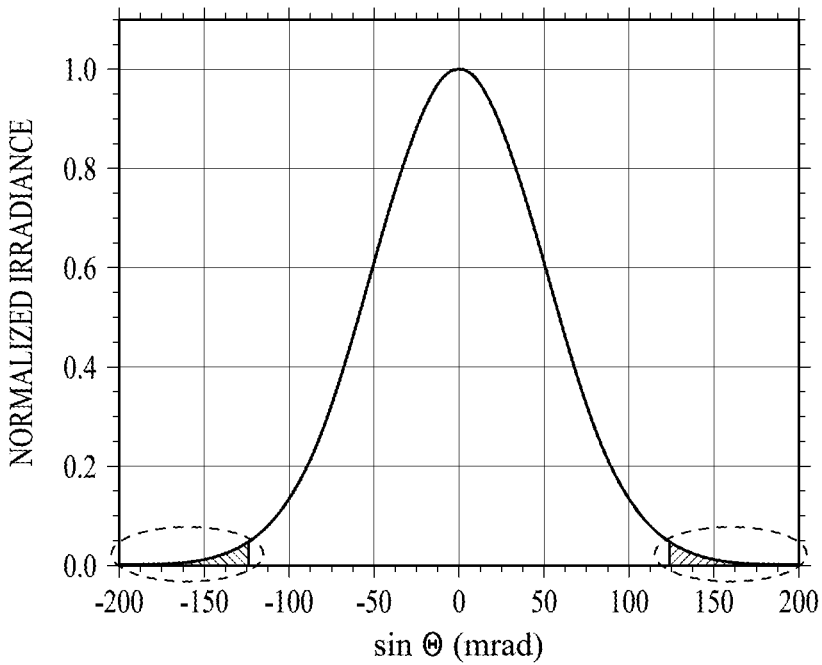
FIG. 2 is a graph showing a normalized irradiance profile.

As seen in FIG. 2, about 5% of the beam power is above 125 mrad. If the maximum clipped power is specified to be $P_{max}$, then the maximum laser power is 20×$P_{max}$ (because of the 5% clipping). For example, if $P_{max}$=100 W, then the maximum laser power would be 2 kW. A lower divergence laser would have a lower percentage of clipped power and thus allow more laser power to be used for the application. In a cutting application, for instance, higher laser power enables higher cutting speed, larger maximum thickness, and/or better edge quality.

It is thus desirable to be able to limit the divergence of the output beam from a laser, and the maximum allowed divergence (and thus maximum allowed power above $\theta_{max}$) will depend on the application and the optical system. Conventional approaches to limiting the divergence of a high-power fiber laser involve designing and manufacturing the laser for inherently low divergence and implementing a free-space aperture to clip the high-divergence wings of the output beam. Managing the maximum divergence through process control can be costly due to low yield, especially if a low $\theta_{max}$ is desired. There are numerous steps in manufacturing that can generate high divergence, including poor-quality splicing, thermal lensing, and/or low-quality optical materials. Implementing a free-space aperture for kW beams is costly, space-consuming, and subject to high failure rates.

Figure 3:
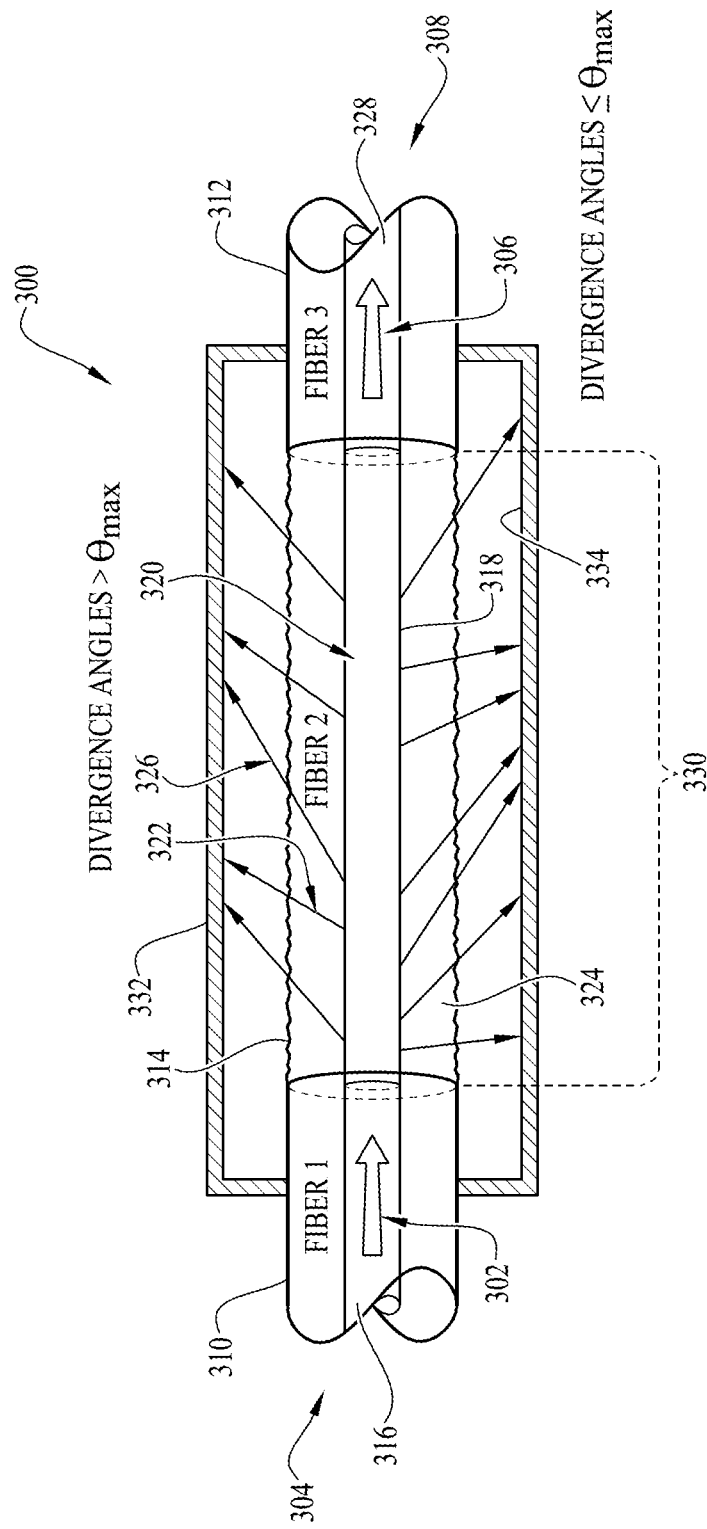
FIG. 3 is a side-elevation view of a divergence-limiting device, according to one embodiment.

FIG. 3 shows a fiber-based, divergence-limiting device 300 for limiting divergence from a first maximum divergence of input light 302 (received at an input 304) to a second maximum divergence of output light 306 (delivered at an output 308). The second maximum divergence of output light 306 is less than the first maximum divergence of input light 302. Accordingly, divergence-limiting device 300 may be coupled to a laser system (not shown) to deliver at an output of the laser system a higher power light, for a given $P_{max\_system}$ (i.e., $P_{max}$, as specified for the laser system) than would otherwise be available for the $P_{max\_input}$ (i.e., $P_{max}$ directly from the input light 302).

In the present example, divergence-limiting device 300 includes an input optical fiber 310, an output optical fiber 312, and an intermediate optical fiber 314 spliced between input optical fiber 310 and output optical fiber 312. In the present example, it is assumed that input optical fiber 310 acts as input 304 that guides input light 302 from the laser system, e.g., from a single fiber-coupled laser module or from a signal combiner that combines the outputs of multiple laser modules, to intermediate optical fiber 314. In other embodiments, input 304 may comprise free-space optics or other form of input. Similarly, output 308 may comprise free-space optics or other form of input.

Note that output optical fiber 312 could include similar or identical cross-sectional structures as those of input optical fiber 310 or intermediate optical fiber 314. In other embodiments, the structure of output optical fiber 312 is different from those of both input optical fiber 310 and intermediate optical fiber 314.

An input-fiber core 316 may have a relatively high NA (e.g., NA>0.20) to reduce bend loss and increase power handling. Other NAs are possible, depending on the laser-processing application.

An intermediate-fiber core 318 has an NA selected to limit the divergence of core-guided light 320 propagating in intermediate-fiber core 318. For example, if $\theta_{max}$=125 mrad is desired, then the NA of intermediate-fiber core 318 is set to about 0.125 (i.e., sin(125 mrad)). For core-guided light 320 traveling in intermediate-fiber core 318, divergence components below the NA of intermediate-fiber core 318 will be well guided (i.e., rays are guide and do not leak). Depending on the particular application, the NA may range from about 0.03 to about 0.3. On a lower end (e.g., 0.03) of the range, because the NA is related to the index difference of the core and the cladding, the index becomes challenging to maintain at low NAs. On a higher end (e.g., 0.3) of the range, the NA would be selected for compatibility with the system optics and mounts.

As input light 302 from input-fiber core 316 enters intermediate-fiber core 318, a portion of input light 302 (referred to as cladding light 322) having a divergence above the value $\theta_{max}$ that is well guided in intermediate optical fiber 314 will leak out from intermediate-fiber core 318 and enter an intermediate-fiber cladding 324 (e.g., comprising fused silica glass) encompassing or covering at least a portion of intermediate-fiber core 318.

Cladding light 322 will either be guided in intermediate-fiber cladding 324 or it can be stripped from intermediate-fiber cladding 324 if some or all of intermediate optical fiber 314 is configured as a cladding-light stripper (CLS). FIG. 3 shows that intermediate optical fiber 314 is configured as a CLS because cladding light 322 diverges away from intermediate-fiber core 318 and is subsequently emitted from intermediate-fiber cladding 324 as stripped light 326 (as shown by thin, diverging arrows). Thus, core-guided light 320 coupled from intermediate-fiber core 318 into an output-fiber core 328 has had high-divergence components of input light 302 removed (i.e., stripped or otherwise directed away from output-fiber core 328) to provide output light 306.

A CLS may be employed in laser systems having a signal combiner to combine the output of multiple laser modules, in which case a CLS may be included after the combiner to remove unwanted cladding light. For such systems, divergence-limiting device 300 having its so-called NA-clipping fiber (i.e., intermediate optical fiber 314 with an appropriately chosen core NA) may replace a standard CLS fiber in the build. In other embodiments, a CLS of intermediate optical fiber 314 is optional when the standard CLS fiber is available downstream in the build.

FIG. 3 shows a CLS region 330 corresponds to a lengthwise portion of intermediate optical fiber 314 that is located within an enclosure 332. Enclosure 332 includes an internal surface 334 confronting CLS region 330 and configured to absorb stripped light 326 (i.e., to convert it to heat). In some embodiments, input optical fiber 310, output optical fiber 312, or intermediate optical fiber 314 extend outside enclosure 332 (i.e., extend beyond the length of enclosure 332) on one or both sides of enclosure 332. For instance, input optical fiber 310 and output optical fiber 312 form, respectively, an input pigtail and/or an output pigtail of divergence-limiting device 300.

The design of intermediate optical fiber 314 can be chosen to ensure that output light 306 exiting output optical fiber 312 has the desired $P_{max}$ within the specification of the optical system. The maximum stripped power depends on the choice of CLS design and aspects of the system configuration (dimensional requirements, heat sinking, and other aspects). It should also be appreciated that the amount of light stripped is also a function of the length of CLS region 330, as light is removed along intermediate optical fiber 314, i.e., as it leaks from intermediate-fiber core 318 lengthwise according to an exponential decay function.

There are several methods to configure some or all of intermediate optical fiber 314 as a CLS. For instance, intermediate-fiber cladding 324 may be coated on its outside surface with a high-index material (e.g., a material with a refractive index equal to or greater than that of glass, such as a polymer) so that cladding light 322 is not guided in intermediate-fiber cladding 324. In another embodiment, intermediate-fiber cladding 324 may be roughened (e.g., random surface texturing) or structured (e.g., notches or other repetitive or discrete structures) by chemical treatment or laser processing. Other methods may be used to fabricate the CLS along some portion of or all of the entire length of intermediate optical fiber 314, and the disclosed subject matter is not limited in this regard.

In some embodiments (not shown), a CLS region may extend partly along the length of a fiber such that one or both ends of the fiber (i.e., ends outside the CLS region) extend as pigtails from an enclosure or are otherwise available outside the CLS region. These fiber extensions (i.e., fiber pigtails) are used to ease manufacturability and serviceability when coupling light from, e.g., input optical fiber 310 to output optical fiber 312. Thus, although not shown this way in FIG. 3, intermediate optical fiber 314 could extend on both sides of CLS region 330.

Figure 4:
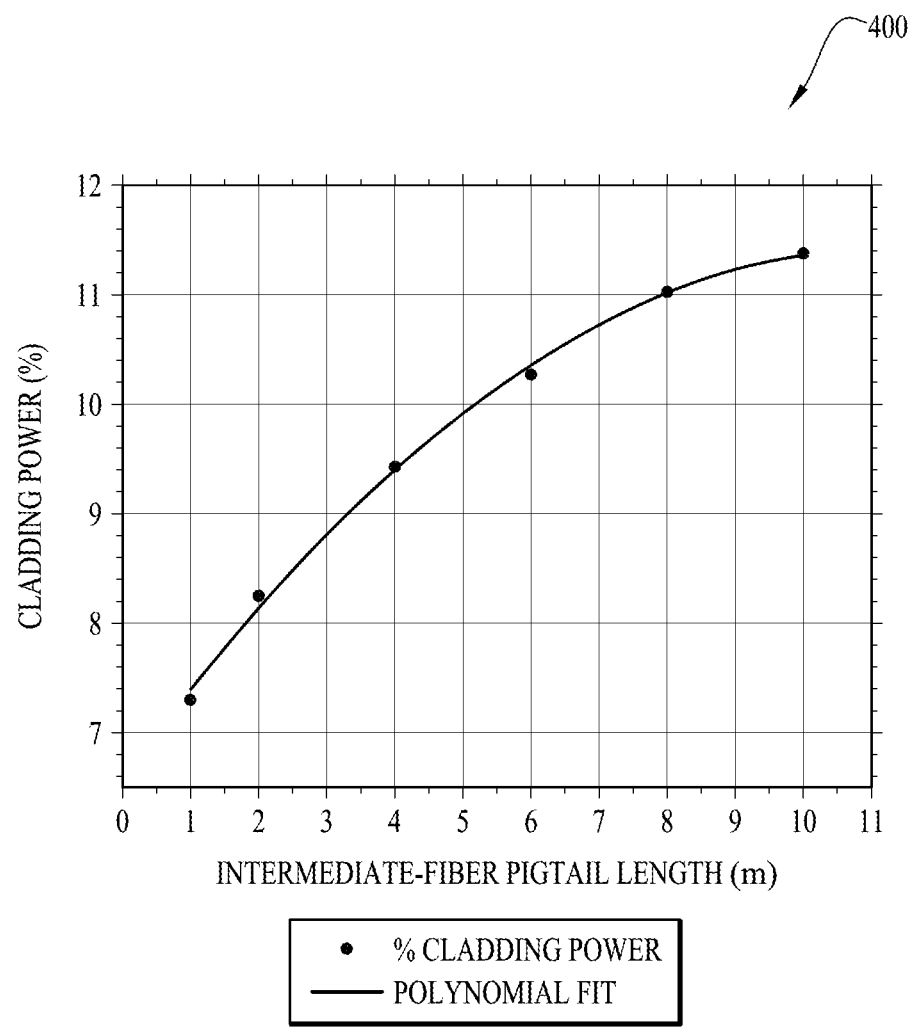
FIG. 4 is a graph showing an example of how a percentage of light in cladding increases as a function of pigtail length beyond a CLS region.

With reference to embodiments including the aforementioned pigtail(s), FIG. 4 is a graph 400 showing one example of how a percentage of light in cladding increases as a function of pigtail length beyond a CLS region. As previously described for divergence-limiting device 300 (FIG. 3), a percentage of light having a divergence greater than the NA supported by intermediate-fiber core 318 will leak out from intermediate-fiber core 318 and enter intermediate-fiber cladding 324 because input light 302 from input-fiber core 316 propagates with some percentage of power at an NA greater than that supported by intermediate-fiber core 318. Assuming there is a pigtail beyond the CLS region, the remaining light in intermediate-fiber core 318 would propagate along the pigtail and completely fill the NA supported by intermediate optical fiber 314. Due to this filled NA, light that continues to propagate in the pigtail would have an increased probability to be lost from intermediate-fiber core 318 into intermediate-fiber cladding 324 due to macro and/or micro perturbations to intermediate optical fiber 314.

Figure 5:
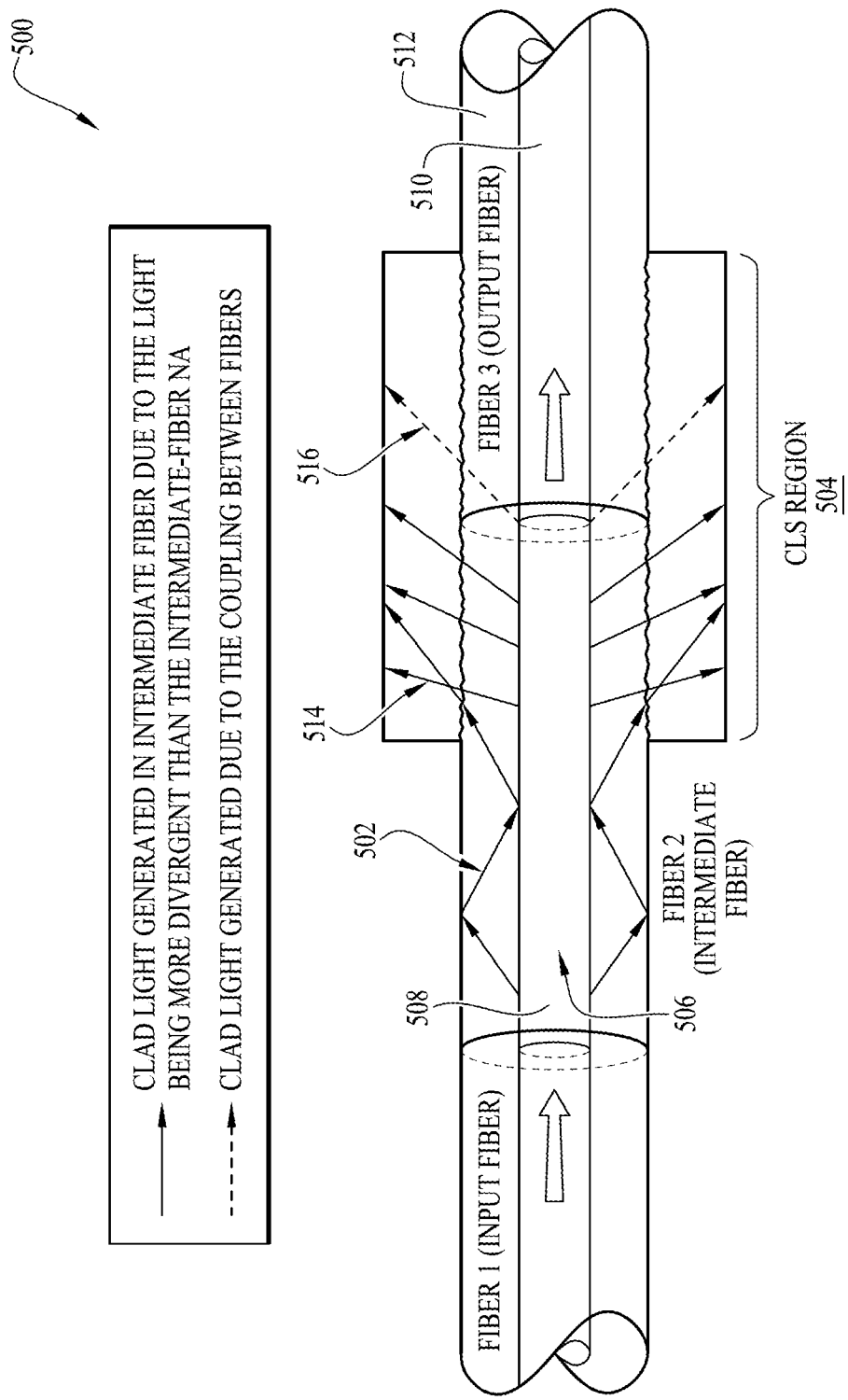
FIG. 5 is an annotated side-elevation view of a divergence-limiting device, according to another embodiment.

Cladding light beyond a CLS region can represent a reliability risk to downstream optical fibers (due to light interacting with the cladding polymer buffer), and it can cause undesirable application results beyond the laser system. Thus, FIG. 5 shows another embodiment of a divergence-limiting device 500 configured to limit generation of cladding light 502 beyond a CLS region 504 by coupling core-guided light 506 present in an intermediate-fiber core 508 to an output-fiber core 510 of an output optical fiber 512 while removing stripped light 514 along CLS region 504.

The coupling method within CLS region 504 could be by optical fusion splicing, by free-space coupling, or by some other coupling method. Often, it will be desirable for the NA of output-fiber core 510 to be larger than that of intermediate-fiber core 508 to avoid complete filling of the NA in output-fiber core 510 and generation of cladding light due to perturbations in output optical fiber 512, as previously described with reference to FIG. 4.

It may also be desirable to use an output optical fiber of different dimensions (core and/or cladding) compared to those of the intermediate optical fiber to minimize the generation of cladding light 516 (represented in FIG. 5 by dashed arrows) generated due to coupling of fibers. In this embodiment, the NA of the output light will have been sufficiently limited due to the intermediate-fiber core NA, and the further generation of cladding light beyond the CLS region will have be minimized due to the coupling of the light to an output fiber with higher NA core within the CLS region.

Figure 6:
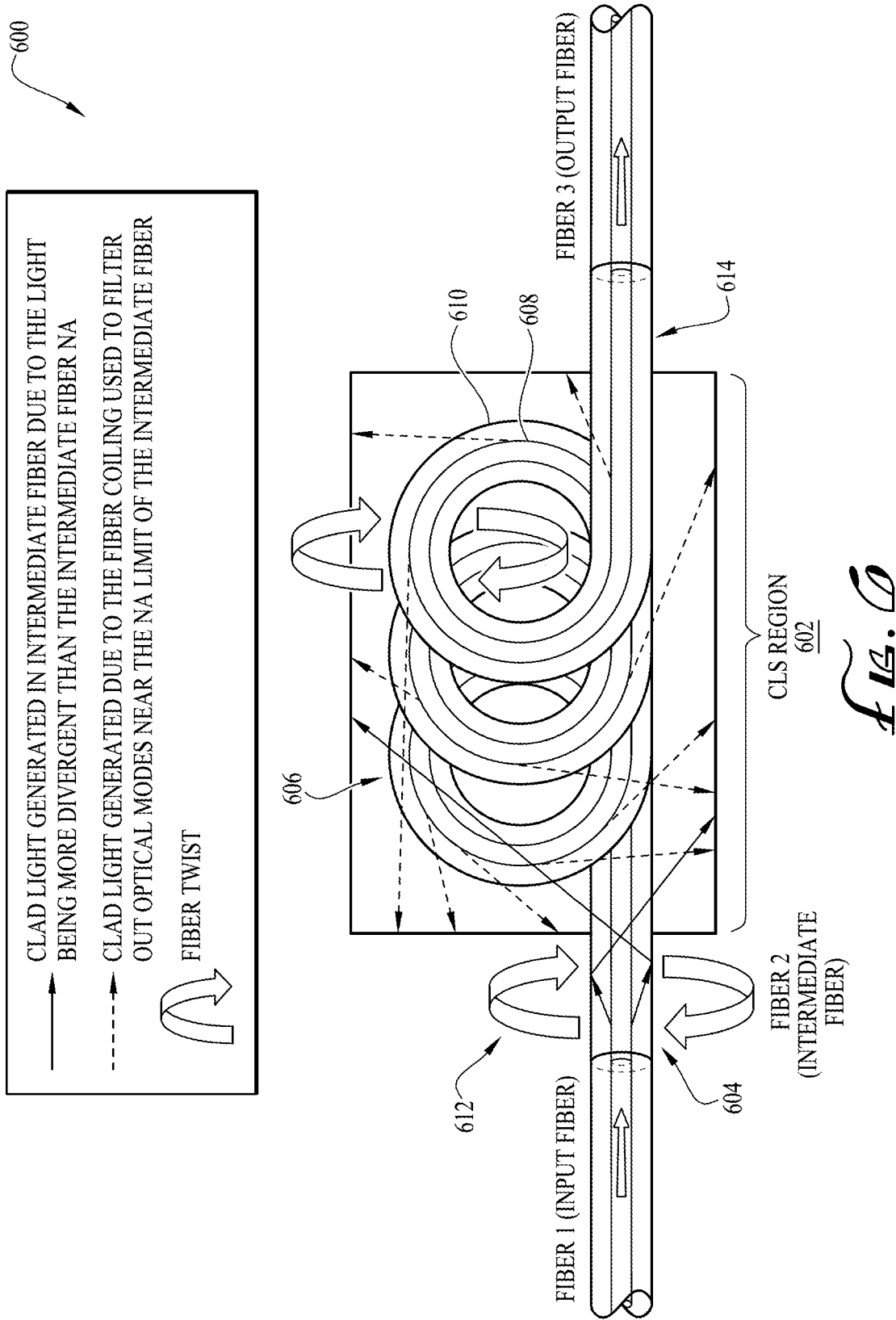
FIG. 6 is an annotated side-elevation view of a divergence-limiting device, according to another embodiment.

FIG. 6 shows another embodiment of a divergence-limiting device 600 in which further generation of cladding light beyond a CLS region 602 is limited by coiling an intermediate optical fiber 604 within all or a portion of CLS region 602. Intermediate-fiber coils 606 act as an additional NA filter allowing for optical modes near the NA limit of intermediate optical fiber 604 to be coupled out of an intermediate-fiber core 608 and into an intermediate-fiber cladding 610. The diameter of intermediate-fiber coils 606 is chosen such that modes with higher NA content are coupled out of intermediate-fiber core 608 but not so tight as to create excessive power loss. Once these optical modes are propagating in intermediate-fiber cladding 610, they can be stripped (as shown) or appropriately handled as part of a downstream CLS. Depending on the architecture of the optical system, it may be appropriate to coil intermediate optical fiber 604 in a single plane or it may be appropriate to coil it in two orthogonal planes to couple modes of both odd and even symmetry with higher NA content out of intermediate-fiber core 608 and into intermediate-fiber cladding 610.

FIG. 6 also demonstrates that further modal discrimination might also be achieved by imparting a twist 612 of intermediate optical fiber 604 in addition to coiling it. By twisting intermediate optical fiber 604 the optical cladding modes experience a further perturbation that helps to frustrate the recoupling of this cladding light back into intermediate-fiber core 608 as intermediate-fiber coils 606 transition back to a less coiled routing. In addition, twisting may be used as an alternative to coils in two orthogonal planes by mixing modes of odd and even symmetry. Fiber twist 612 may be introduced as part of the fiber routing process or as part of the fiber manufacturing process itself by rotating the fiber preform during the fiber draw.

As described previously, a fiber pigtail 614 of intermediate optical fiber 604 extends beyond CLS region 602 without further generation of cladding light, which can be beneficial for manufacturing or servicing purposes.

Figure 7:
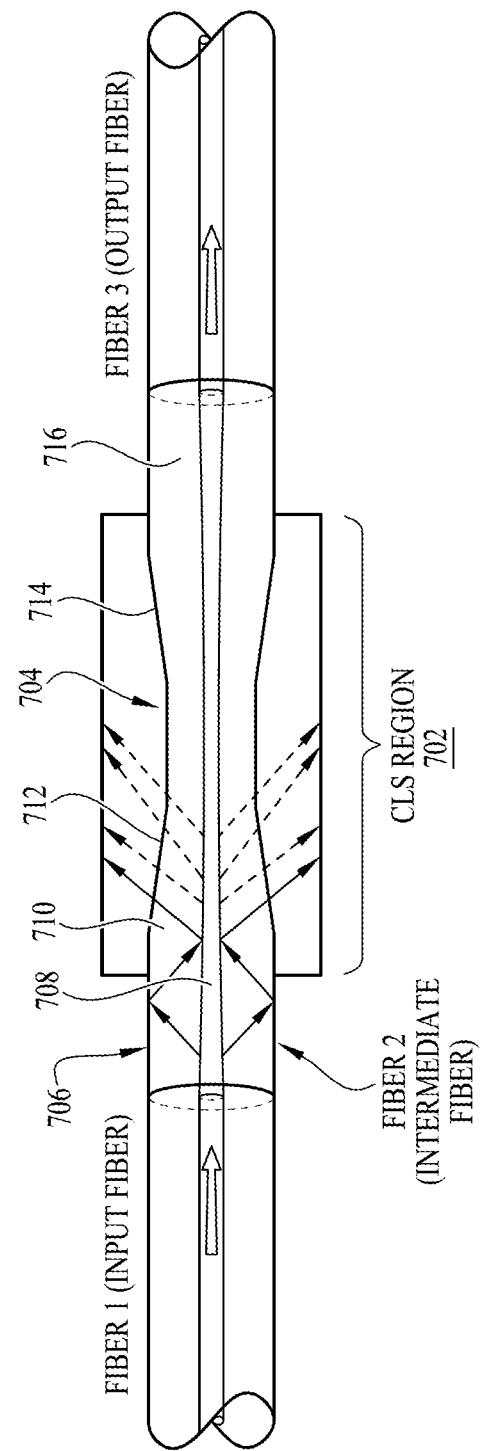
FIG. 7 is an annotated side-elevation view of a divergence-limiting device, according to another embodiment.

FIG. 7 shows another embodiment of a divergence-limiting device 700 in which further generation of cladding light beyond a CLS region 702 is limited by an intermediate-fiber taper 704 in an intermediate optical fiber 706 and throughout all or a portion of CLS region 702.

Intermediate-fiber taper 704 can be created by a number of methods, some of which might include (but are not limited to) using a fusion-splicer, a $CO_2$ laser, a flame, or some other heat source. As intermediate optical fiber 706 is tapered down to a smaller diameter, divergence of light in intermediate-fiber core 708 increases such that those optical modes near the NA limit of intermediate optical fiber 706 will be coupled out of intermediate-fiber core 708 and into an intermediate-fiber cladding 710 acting as an additional NA filter. The degree to which intermediate optical fiber 706 is tapered (often times referred to as the taper ratio) is determined such that modes with higher NA content are coupled out of intermediate-fiber core 708 but not so extreme as to create excessive power loss. Once these optical modes are propagating in intermediate-fiber cladding 710, they can be appropriately handled as part of a CLS as previously described.

A down taper 712 is followed by an up taper 714, and this arrangement allows light prorogating in intermediate-fiber core 708 to return to a divergence that is close to the NA of intermediate optical fiber 706 but not in the NA filled condition that can lead to further generation of cladding light beyond CLS region 702. As with other embodiments, it may be practical for a fiber pigtail 716 of intermediate optical fiber 706 to extend beyond CLS region 702.

Other techniques could also be employed to change the minimum NA stripped within intermediate optical fiber 706, the stripping rate, or efficiency. For example, the fiber upstream from and/or within the CLS could be bent or down tapered. If down tapered, the fiber downstream from the CLS could remain at the smaller diameter or it could be up tapered. The length of the CLS also could be varied.

Figure 8:
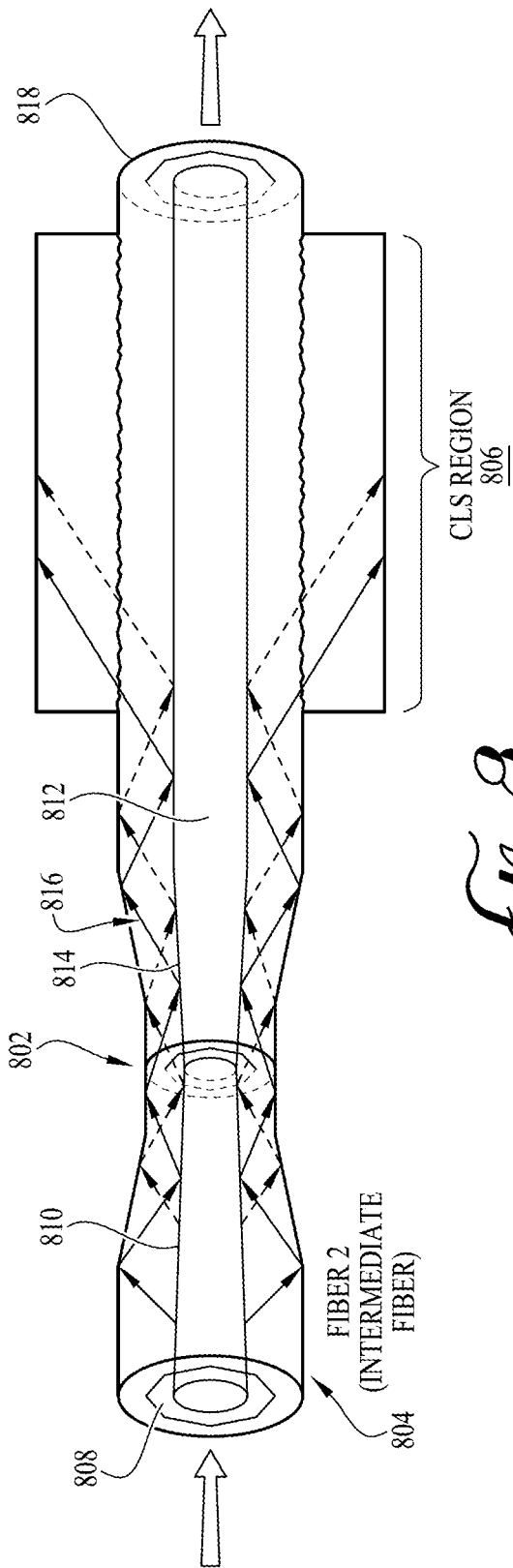
FIG. 8 is an annotated side-elevation view of a divergence-limiting device, according to another embodiment.

FIG. 8 shows another embodiment of a divergence-limiting device 800 in which an intermediate-fiber taper 802 of an intermediate optical fiber 804 is formed before a CLS region 806. Divergence-limiting device 800 may be deployed in laser architectures where co-locating a CLS region with an additional NA filtering region is challenging or impractical. For example, in some laser systems, the optical fiber used has multiple guiding regions known as double- or triple-clad fiber. These multiple cladding fibers allow for light outside of the fiber core to also propagate with little loss along the length of the optical fiber. Should a fiber taper be used with these types of fibers, higher NA light that is lost from the fiber core due to the down taper will recouple into the core during the up taper, assuming the taper is not co-located with a CLS region, because the process is adiabatic.

To address the recoupling issue, intermediate optical fiber 804 includes an octagon-shaped cladding 808. In other embodiments, the cladding shape could be, but not limited to, a hexagon, D-shaped, or any other polygon or non-circular cross-sectional shape. As the higher NA light is lost from the fiber core into the cladding at a down taper 810, the perturbation of the light with octagon-shaped cladding 808 disturbs the optical fiber cladding modes such that they will not be recoupled into intermediate-fiber core 812 at an up taper 814. Cladding light 816 continues to propagate in octagon-shaped cladding 808 of intermediate optical fiber 804 until being appropriately handled at CLS region 806 downstream of intermediate-fiber taper 802. Again, in this embodiment, it may be practical for a fiber pigtail 818 to extend beyond CLS region 806.

Figure 9:
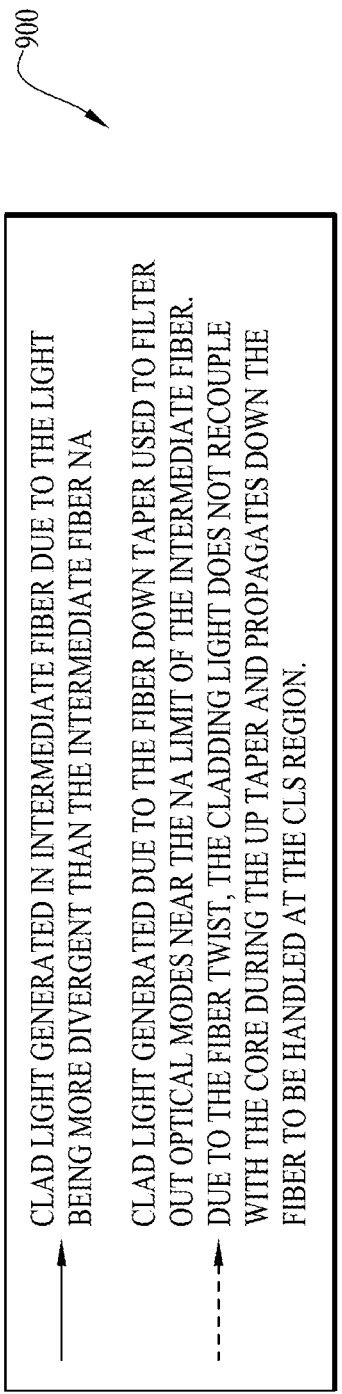
FIG. 9 is an annotated side-elevation view of a divergence-limiting device, according to another embodiment.
Figure 9:
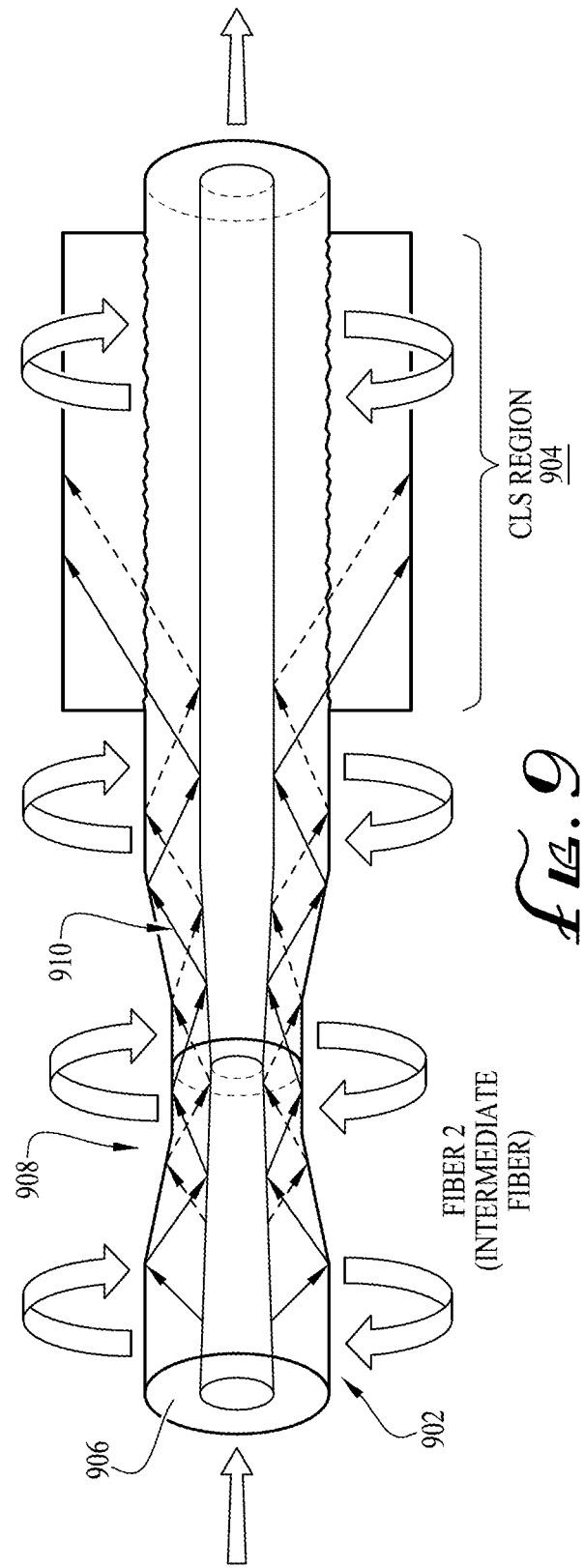

FIG. 9 shows a another embodiment of a divergence-limiting device 900 where tapering of an intermediate optical fiber 902 is done before a CLS region 904, similar to divergence-limiting device 800 (FIG. 8). Unlike octagon-shaped cladding 808, however, intermediate-fiber cladding 906 is circular in its cross-sectional shape, which is advantageous for ease of fiber processing, such as fusion splicing, during the fabrication of an optical system.

To overcome the recoupling of cladding light generated at an intermediate-fiber taper 908 (described previously with reference to intermediate-fiber taper 802, FIG. 8), intermediate optical fiber 902 is twisted to create perturbations to the optical cladding modes and frustrate the adiabatic process resulting in further NA filtering in intermediate optical fiber 902. Cladding light 910 is then allowed to propagate further down the optical fiber down to CLS region 904, as previously described. The fiber twist could be introduced as part of the fiber routing process or it could be done as part of the fiber manufacturing process itself by rotating the fiber preform during the fiber draw. Again, in this embodiment it may be practical for the fiber pigtail of the intermediate fiber to extend beyond the CLS region.

Having described and illustrated the general and specific principles of examples of the above-described divergence-limiting device, it should be appreciated that the examples may be modified in arrangement and detail without departing from such principles. For example, the above description refers to fiber lasers, but this technology could be applied to any fiber-coupled laser (e.g., diode-pumped solid-state lasers, disk lasers, and diode lasers). Thus, skilled persons will appreciate that many changes may be made to the details of the above-described embodiments without departing from the underlying principles of the disclosure. The scope of the present invention should, therefore, be determined only by the following claims and equivalents.

The invention claimed is:

1. An optical fiber-based divergence-limiting device for limiting divergence from a first maximum divergence of input light to a second maximum divergence of output light, in which the second maximum divergence is less than the first maximum divergence, the optical fiber-based divergence-limiting device comprising:
an input optical fiber configured to receive the input light;
an output optical fiber configured to deliver the output light;
an intermediate optical fiber spliced between the input optical fiber and the output optical fiber, the intermediate optical fiber comprising:
  a core configured to receive the input light, through which a first portion of the input light is configured to be guided from the input optical fiber to the output optical fiber, the core having a numerical aperture configured to limit the first portion of the input light to that having the second maximum divergence or less; and
  a cladding covering at least a portion of the core and through which a second portion of the input light is configured to be removed from the core, the numerical aperture is further configured to limit the second portion of the input light to that having a greater divergence than the second maximum, and the first portion of the input light is coupled to the output optical fiber to form the output light.

2. The optical fiber-based divergence-limiting device of claim 1, further comprising an enclosure housing a least a portion of the cladding from which stripped light is configured to be emitted and absorbed by an internal surface of the enclosure.

3. The optical fiber-based divergence-limiting device of claim 1, in which a cladding-light stripper (CLS) fiber comprises the core and cladding.

4. The optical fiber-based divergence-limiting device of claim 3, in which the CLS fiber includes a CLS region along a lengthwise portion of the CLS fiber.

5. The optical fiber-based divergence-limiting device of claim 4, in which the CLS region is a coated section along the cladding, in which the coated section has a refractive index that is greater than or equal to that of the cladding.

6. The optical fiber-based divergence-limiting device of claim 4, in which the CLS region includes a roughened-surface section along the cladding.

7. The optical fiber-based divergence-limiting device of claim 6, in which the CLS region is chemically treated or laser processed.

8. The optical fiber-based divergence-limiting device of claim 4, in which the CLS region includes a structured-surface section along the cladding.

9. The optical fiber-based divergence-limiting device of claim 4, further comprising a fiber coil in the CLS region.

10. The optical fiber-based divergence-limiting device of claim 4, further comprising a fiber taper in the CLS region.

11. The optical fiber-based divergence-limiting device of claim 1, further comprising a fiber taper formed in the core and cladding.

12. The optical fiber-based divergence-limiting device of claim 1, further comprising an input pigtail including the input optical fiber.

13. The optical fiber-based divergence-limiting device of claim 1, further comprising an output pigtail including the output optical fiber.

* * * * *